United States Patent
Beaujard et al.

(10) Patent No.: US 6,557,753 B1
(45) Date of Patent: May 6, 2003

(54) METHOD, A SMART CARD AND TERMINALS FOR EFFECTING TRANSACTIONS THROUGH A TELECOMMUNICATION NETWORK

(75) Inventors: Olivier Beaujard, Neuilly; Patrick Imbert, Marseilles, both of (FR)

(73) Assignee: Gemplus (FR)

( * ) Notice: Subject to any disclaimer, the term of this patent is extended or adjusted under 35 U.S.C. 154(b) by 0 days.

(21) Appl. No.: 09/573,179

(22) Filed: May 19, 2000

Related U.S. Application Data

(63) Continuation of application No. PCT/FR98/02431, filed on Nov. 16, 1998.

(30) Foreign Application Priority Data

Nov. 20, 1997 (FR) .............................. 97 14578

(51) Int. Cl.⁷ ................................. G06F 17/00
(52) U.S. Cl. ..................... 235/375; 235/380; 455/426; 455/428; 455/432; 455/435
(58) Field of Search ................. 235/375, 380; 455/426, 428, 432, 435

(56) References Cited

U.S. PATENT DOCUMENTS

| | | | |
|---|---|---|---|
| 5,227,615 A | 7/1993 | Oogita | |
| 5,915,226 A | * 6/1999 | Martineau | 455/558 |
| 5,987,325 A | * 11/1999 | Tayloe | 455/435 |
| 6,092,133 A | * 7/2000 | Erola et al. | 235/380 X |
| 6,161,012 A | * 12/2000 | Fenton et al. | 455/432 |
| 6,223,052 B1 | * 4/2001 | Ali Vehmas et al. | 455/551 |

FOREIGN PATENT DOCUMENTS

| | | |
|---|---|---|
| DE | 29520925 U1 | 11/1996 |
| EP | 0355372 A1 | 2/1990 |
| FR | 556970 A1 * | 8/1993 |
| FR | 2729523 | 7/1996 |
| GB | 2269512 | 2/1994 |
| WO | WO96/25828 | 8/1996 |
| WO | WO97/05729 | 2/1997 |

* cited by examiner

Primary Examiner—Michael G. Lee
Assistant Examiner—Allyson Sanders
(74) Attorney, Agent, or Firm—Burns, Doane, Swecker & Mathis, L.L.P.

(57) ABSTRACT

A method for effecting transactions through a telecommunication network by smart cards and telecommunication terminals provided with at least two smart card reading interfaces, one for receiving a subscriber identification smart card dedicated to telephony, the other for receiving a smart card dedicated to one or more applications other than telephony. Communication facilities are added to the subscriber identification card to enable it to control any application card through the telecommunication terminal.

16 Claims, 4 Drawing Sheets

- COMMAND "CARD 2 PRESENT"

- COMMAND "SWITCH ON CARD 2"

- COMMAND "SWITCH OFF CARD 2"

- COMMAND "SEND INCOMING COMMAND CARD 2"

- COMMAND "SEND OUTGOING COMMAND CARD 2"

METHOD, A SMART CARD AND TERMINALS FOR EFFECTING TRANSACTIONS THROUGH A TELECOMMUNICATION NETWORK

This disclosure is a continuation of International Application No. PCT/FR98/02431, filed Nov. 16, 1998, which claims priority from, French Patent Application No. 97/14578, filed Nov. 20, 1997, and, the contents of which are incorporated herein by reference.

FIELD OF THE INVENTION

The invention relates to a method for effecting transactions through a telecommunications network by means of a smart card and telecommunication terminals. It also relates to smart cards and terminals for implementing the method. It finds many applications in monetary transactions, electronic purses and transactions relating to health and gaming. The telecommunications networks concerned are all networks liable to be used by a telephone subscriber in order to have access to another subscriber or to services. Amongst these networks, telephone networks, switched networks or ISDN and cellular telephone networks can be cited.

BACKGROUND OF THE INVENTION

The new generation of telecommunication terminals provides for these terminals to be equipped with two smart card reading interfaces, one for communicating with a subscriber identification smart card dedicated to telephony, such as for example SIM (Subscriber Identity Module) cards in the case of the cellular telecommunication system and the other for a smart card (application card) dedicated to one or more applications such as telephony. It may for example be a case of an electronic purse card.

Smart cards dedicated to one or more applications other than telephony can be issued by completely independent operators and communication with these applications cards is established in accordance with distinct protocols.

It consequently proves necessary for this new generation of telecommunication terminals to support sets of commands applying these different types of applications cards (for example banking application or loyalty application).

This is very constraining for service providers who must because of this be bound to a terminal manufacturer in order to offer their applications to their customers.

In addition, this imposes a limitation in the choice of applications cards which can be used with a given telecommunication terminal, to those which were provided initially, otherwise it would be necessary to modify the terminal software.

The present invention remedies these problems.

SUMMARY OF THE INVENTION

The first objective of the invention is not to burden the communication logic interfaces of the terminal whilst enabling it to accept any application card, by introducing communication means to any subscriber identification card dedicated to telephony to enable it to control any application card through the telecommunication terminal.

Another object of the invention is more particularly a method for effecting transactions through a telecommunication network by means of smart cards and telecommunication terminals for access to the network provided with at least two smart card reading interfaces, one for receiving a subscriber identification smart card dedicated to telephony, the other for receiving an additional smart card dedicated to one or more applications other than telephony; characterized in that the subscriber identification smart card communicates with the additional card via the terminal, by means of a set of commands intended to control the said additional card, these commands being preformatted by the subscriber identification card according to the format of the communication protocol of the additional card and transmitted by the terminal in accordance with the transportation protocol of the latter.

Another object of the invention is a subscriber identification telephone smart card, characterized in that it has means of communicating with an additional card dedicated to one or more applications other than telephony, via a telecommunication terminal provided with at least two smart card reading interfaces, one for receiving the subscriber identification smart card dedicated to telephony and the other for receiving the additional smart card, these means comprising a set of commands intended to control the additional card, the said commands being preformatted by the subscriber identification card according to the format (APDU) of the communication protocol of the additional card and transmitted by the terminal according to the transportation protocol of the latter.

Another object of the invention is a telecommunication terminal for access to the network provided with at least two smart card reading interfaces, one for receiving a subscriber identification smart card dedicated to telephony, the other for receiving an additional smart card dedicated to one or more applications other than telephony, characterized in that it has:

means adapted for receiving commands sent by the subscriber identification card according to the transportation protocol of the said terminal and intended to control the additional card, the said commands being preformatted by the subscriber identification card according to the format of the communication protocol of the additional card, means for transmitting, amongst these commands, the commands "send incoming/outgoing command card 211 to the additional card as preformatted, means for executing, amongst these commands, the commands "switch card 2 on/off", means for sending a command "card 2 present" to the subscriber identification card.

BRIEF DESCRIPTION OF THE DRAWINGS

Other particularities and advantages of the invention will emerge from a reading of the description made below, given by way of illustrative and non-limitative example with regard to the figures, in which.

DETAILED DESCRIPTION

As stated, the principle of the invention applies to any type of telephony network, switched telephone network, ISDN or cellular (GSM) network. However, the following description is given for a cellular telecommunication network in which the terminals are mobile radio telephones.

Figure 1:
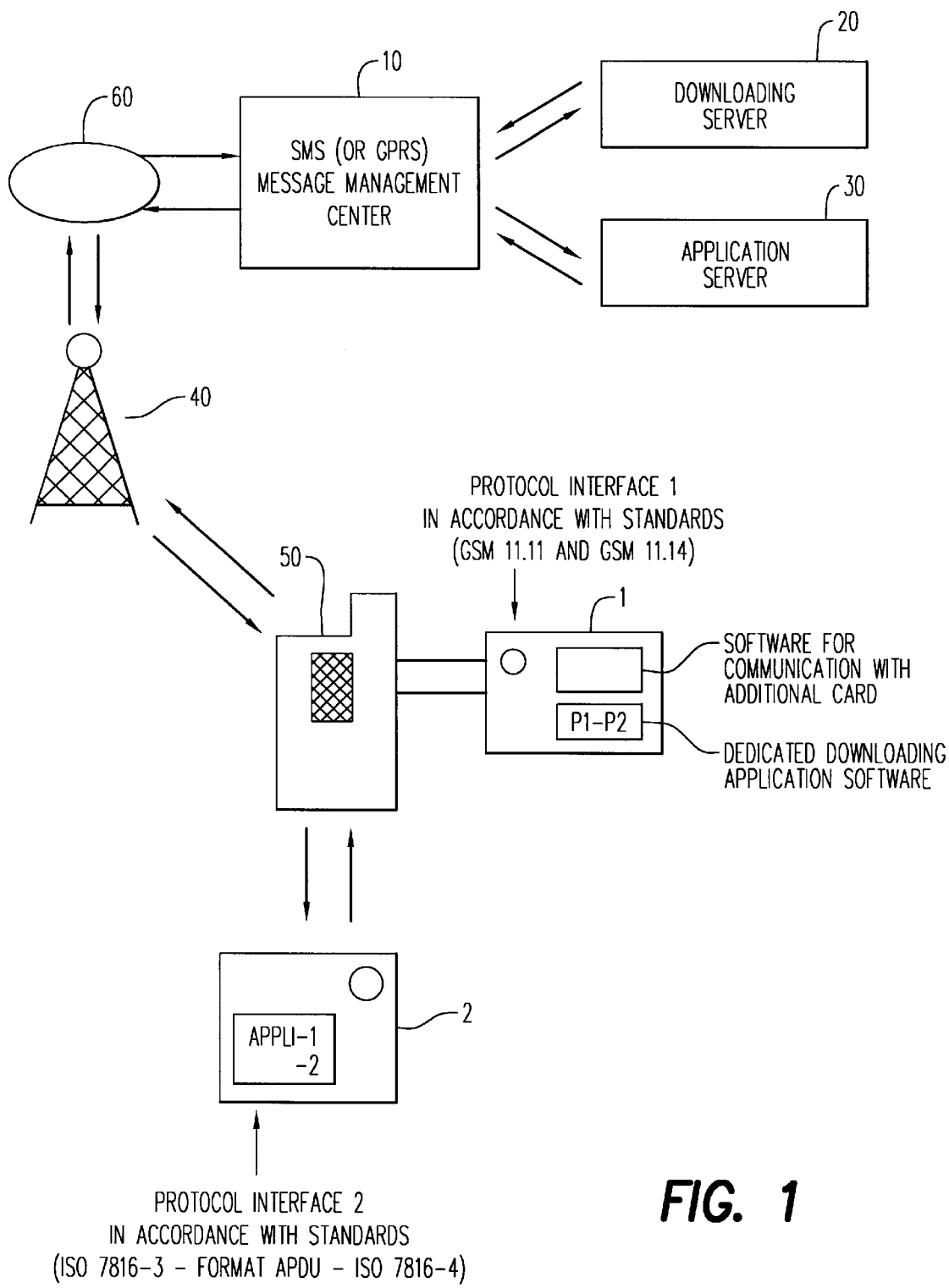
Figure 1 depicts schematically an overall view of a telecommunication network for implementing the method of the invention.

According to this example illustrated by FIG. 1 the system has:

- a centre 10 for managing the messages, SMS (Short Message Service Centre) or GPRS (Global Packet Radio Service);
- a downloading server 20 containing the programs dedicated to the implementation of applications,
- an application server 30: electronic purse, bank, loyalty points given by a merchant;
- a GSM network 60 containing at least one cellular terminal 40. Each terminal enables the user to be connected to the network of the operator;
- a mobile telephone 50 of the user. A mobile telephone is composed of a reception antenna, a battery, a display screen, a keypad, one or more card interfaces and a microprocessor containing a system software package.

In the present invention, the mobile telephone is provided with two smart card interfaces

- a subscriber identification card 1 referred to as an SIM card. This card is present in the mobile telephone of the user and enables him to be identified by the cellular telephony operator,
- an additional card 2 referred to as an application card since it is intended for applications of a type other than the application of the SIM card. These applications can be electronic purse, bank or loyalty point applications.

Figure 2:
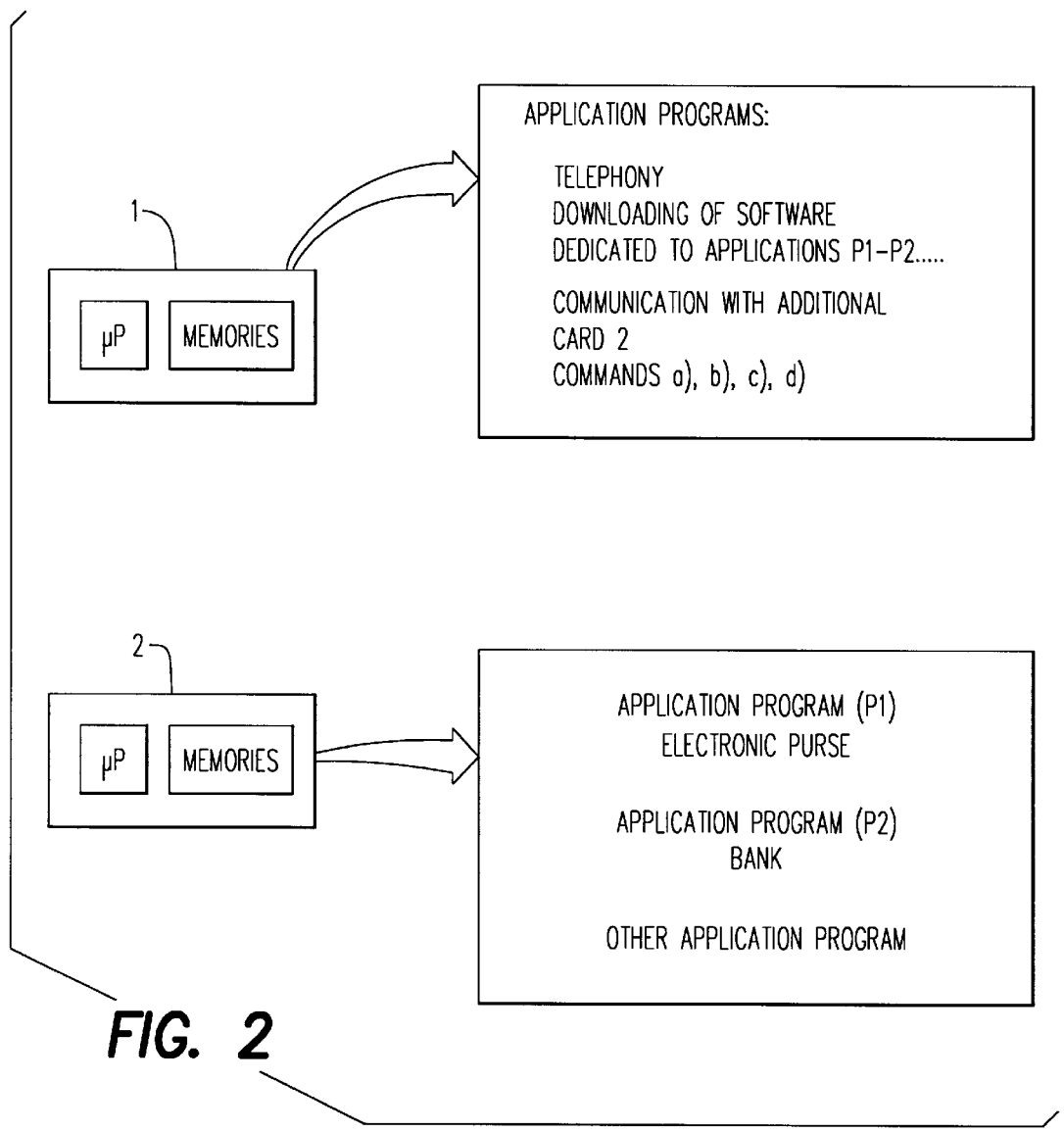
FIG. 2 depicts in more detail and schematically a subscriber identification card and an additional card.

FIG. 2 depicts the elements contained in the SIM card 1 and in the additional card 2 in order to implement the invention.

The SIM card 1 contains a microprocessor, a read only memory (ROM), a random access memory (RAM) and a memory of the EEPROM type. The read only memory (ROM) and EEPROM memory contain software and data enabling the SIM card to operate. It is a case notably of system software and one or more downloaded programs P1–P2 dedicated to the implementation of applications by the additional card. Each program dedicated to the application implementation contains one or more applications for the additional card. These applications correspond to the management of the man machine interface with the user, to the management of the communication with the additional card and the management of the communication with the application server 30 linked to the additional card.

This set of commands has preformatted commands in accordance with the APDU format (ISO-7816-4), which is the format of the communication protocol of the card 2. These commands are encapsulated by the SIM card in accordance with the transportation protocol GSM 11.14 and transmitted in accordance with this protocol by the terminal (the commands sent by the SIM card are read by the terminal).

More precisely, the SIM card 1 has the four following commands available:

a)—"switch on card 2"
b)—"switch off card 2"
c)—"send incoming command to card 2"
d)—"send outgoing command to card 2".

The first two, a), b), are executed by the terminal, the other two, c) and d), are communicated in APDU format to the card 2.

A diagram illustrating the different exchanges in more detail is illustrated below with regard to FIG. 3.

The additional card 2 (application card) is composed of a microprocessor, a read only memory (ROM), a random access memory (RAM) and a memory of the EEPROM type. The read only memory (ROM) and EEPROM memory contain software and data for the operation of this application card, notably system software and applications software (for example electronic purse software and/or loyalty points management software etc).

The terminal, which is a mobile telephone according to this example, allows the insertion of two cards. For this purpose it has two smart card reading interfaces. The first interface allows insertion of the SIM card identifying the user of the telephone on the network to which it is connected. The additional card interface or interfaces enable the user to insert cards of another type (bank card, loyalty card, health card, etc).

The terminal also has elements which are not shown, such as a microprocessor and a program memory containing system software and communication software.

This communication software is according to the invention able to receive the commands sent by the SIM card.

This software also makes it possible to transmit to the card 2 incoming/outgoing commands as preformatted, that is to say to transmit them in the APDU format, to execute the switch on/off card 2 commands and to send a "card 2 present" command to the SIM card as soon as the mobile telephone has detected the presence of a card 2 in its reader. The detection can be mechanical or electrical. This command is sent to the SIM card in accordance with the GSM 11.14 communication protocol.

Details will now be given of the dialogue between the elements of the system from the diagram in FIG. 3 in the case of an incoming or outgoing command sent by the SIM card for the additional card 2. An incoming command is typically a write command given to the card 2, this card being accompanied by data to be written.

An outgoing command is typically a read command given to the card 2 at step I, the SIM card encapsulates the APDU format command (ISO-7816-4) in an SIM TOOLKIT command of the standard GSM 11.14, at step II, the terminal recovers the APDU command and communicates it to the additional card 2, at step III, the additional card 2 sends a return code SW1/SW2 in the APDU format to the terminal. This code is provided with data in the case of an outgoing command, at step IV, the terminal prepares the "Terminal Response" TR and sends the response to the SIM card with the return code, at step V, the SIM card processes the response in the case of good reception, or otherwise recommences as from step I.

Figure 4:
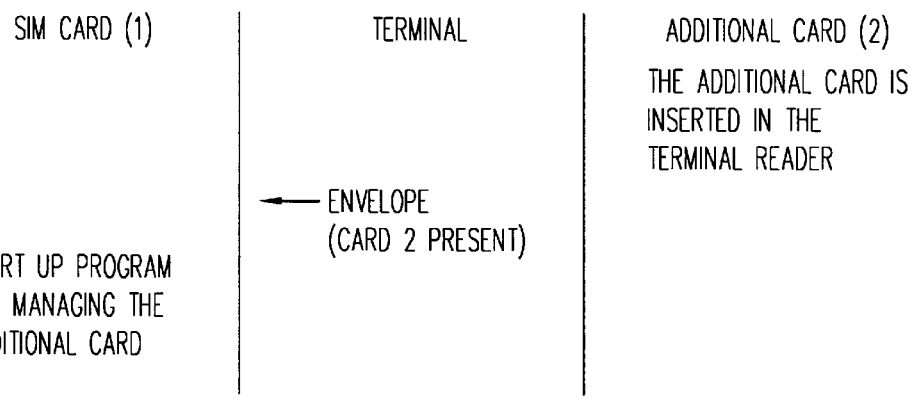
FIG. 4 illustrates in a more general fashion the exchanges between the different elements for all the commands.
Figure 4:
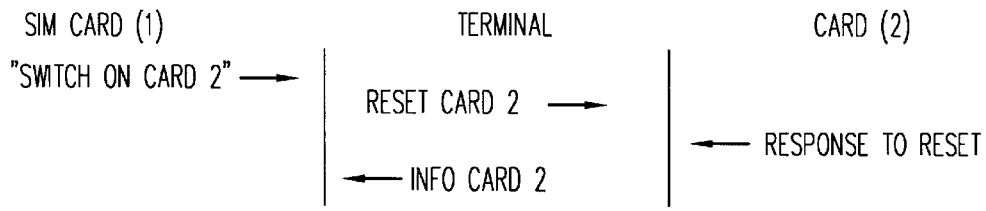
Figure 4:
Figure 4:
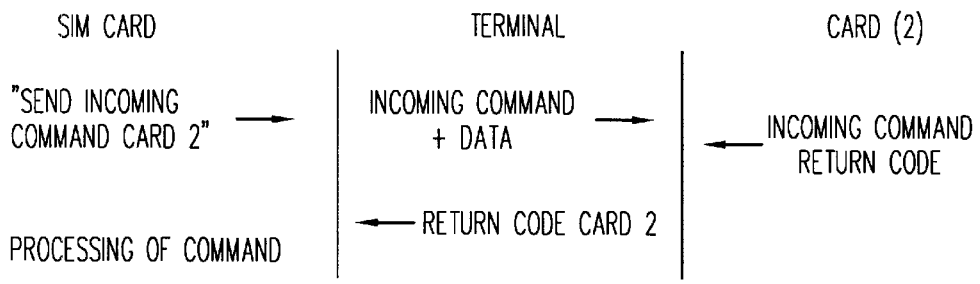
Figure 4:
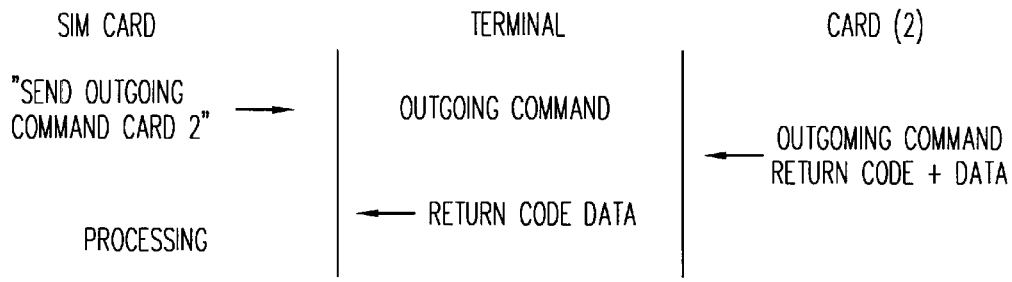

FIG. 4 illustrates the essential commands used to establish a dialogue between the SIM card and the additional card—card 2—through the terminal.

The command "card 2 present" is sent by the terminal. The other four commands are sent by the SIM card for the terminal which reads them. The command "Switch On Card 2", is executed by the terminal and results in an order RESET sent to the card 2. The command "Switch Off Card 2" is executed by the terminal, which for this purpose no longer supplies current to the card 2.

Figure 3:
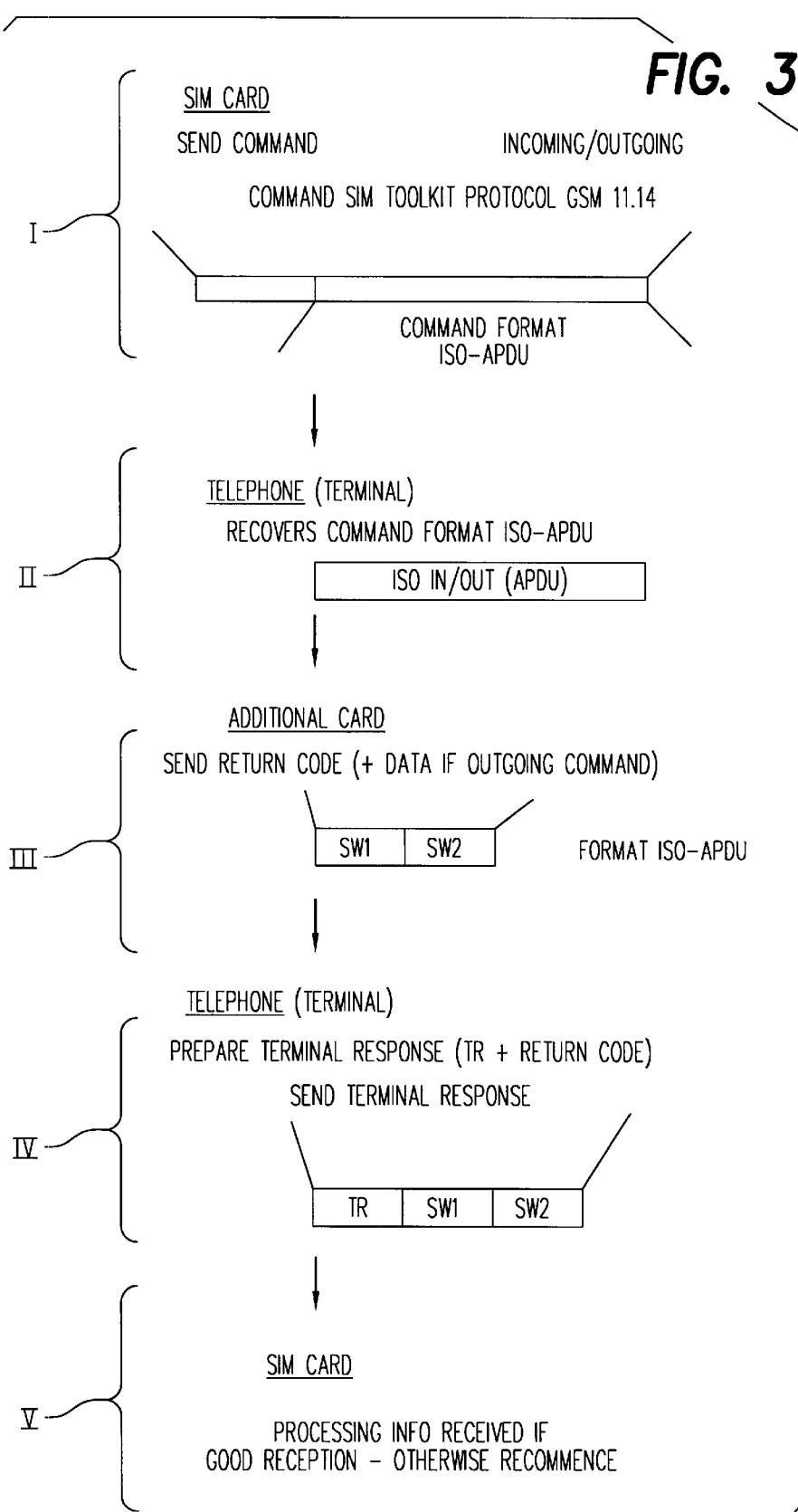
FIG. 3 illustrates in detail the exchanges between the different elements of the system in the case of an incoming or outgoing command in accordance with the method.

The card 2 incoming/outgoing commands have already been detailed from the diagram in FIG. 3.

What is claimed is:

1. A method for effecting transactions through a telecommunication network by means of a telecommunications terminal having at least two smart card interfaces, one of which receives a subscriber identification smart card that is associated with telephony and that communicates with said terminal by means of a first protocol, and another of which receives a second smart card having at least one application that is not associated with telephony and that communicates via a second protocol different from said first protocol, comprising the steps of:

storing in said subscriber identification smart card a set of commands that pertain to said application and that are formatted in accordance with said second protocol;

transmitting one of said formatted commands from said subscriber identification smart card to said terminal in accordance with said first protocol; and transmitting said formatted command from said terminal to said second smart card.

2. The method of claim 1 wherein said stored set of commands includes the following commands:

a command to send data to the second smart card by means of an incoming command; and a command to retrieve data from the second smart card by means of an outgoing command.

3. The method of claim 2 wherein said command set further includes commands to the terminal to energize and de-energize the second smart card.

4. The method of claim 1 further including the step of sending a command from the terminal to the subscriber identification smart card that indicates a smart card is present in the other interface.

5. The method of claim 1 wherein said commands are associated with a program that is stored in a program memory of the subscriber identification smart card and that pertains to said application.

6. The method of claim 5 further including the step of downloading said program into said program memory from an application server accessible by said terminal over the telecommunication network.

7. The method of claim 1 wherein said telecommunication network is a mobile radio telephony network.

8. The method of claim 1 wherein said telecommunication network is a switched telephone network.

9. The method of claim 1 wherein said telecommunication network is an integrated services digital network.

10. The method of claim 1 wherein said subscriber identification smart card encapsulates said formatted commands into commands associated with said first protocol, for transmission to said terminal.

11. The method of claim 1 wherein said first protocol is defined by GSM standard 11.14, and said second protocol corresponds to the APDU format for smart cards.

12. A subscriber identification telephony smart card that communicates with a second smart card, having at least one application that is not associated with telephony, by means of a terminal, comprising:

a memory storing a set of commands that pertain to said application and that are formatted in accordance with a first protocol via which said second smart card communicates; and means for transmitting said formatted commands to a terminal in accordance with a second protocol via which said terminal communicates.

13. The smart card of claim 12 wherein said set of commands are stored in a program memory of the subscriber identification smart card as part of a first program that pertains to said application, and further including a second program stored in said program memory for downloading said first program to said memory from a server accessible by a terminal with which said smart card is communicating.

14. The smart card of claim 13 wherein said first program manages a user interface associated with said application and manages communication with said second smart card.

15. The smart card of claim 12 wherein said transmitting means encapsulates said formatted commands into commands associated with said second protocol, for transmission to a terminal.

16. The smart card of claim 12 wherein said first protocol corresponds to the APDU format for smart cards, and the second protocol is defined by GSM standard 11.14.

\* \* \* \* \*